US012807361B2

(12) United States Patent
Fries

(10) Patent No.: US 12,807,361 B2
(45) Date of Patent: Nov. 24, 2026

(54) LIFTING MEANS FOR A PACKAGING MACHINE WITH TWO COUPLING RODS

(71) Applicant: GEA Food Solutions Germany GmbH, Biedenkopf-Wallau (DE)

(72) Inventor: Alexander Fries, Biedenkopf-Wallau (DE)

(73) Assignee: GEA Food Solutions Germany GmbH, Biedenkopf-Wallau (DE)

( * ) Notice: Subject to any disclaimer, the term of this patent is extended or adjusted under 35 U.S.C. 154(b) by 201 days.

(21) Appl. No.: 18/718,960

(22) PCT Filed: Dec. 19, 2022

(86) PCT No.: PCT/EP2022/086588
§ 371 (c)(1),
(2) Date: Jun. 12, 2024

(87) PCT Pub. No.: WO2023/117860
PCT Pub. Date: Jun. 29, 2023

(65) Prior Publication Data

US 2025/0033822 A1 Jan. 30, 2025

(30) Foreign Application Priority Data

Dec. 22, 2021 (DE) ..................... 10 2021 214 892.1

(51) Int. Cl.
*B66F 7/00* (2006.01)
*B65B 43/08* (2006.01)
(Continued)

(52) U.S. Cl.
CPC .............. *B65B 65/02* (2013.01); *B65B 43/08* (2013.01); *B65B 51/14* (2013.01); *B65B 61/005* (2013.01); *F16H 21/16* (2013.01)

(58) Field of Classification Search
CPC .... B66F 7/00; B66F 7/04; B66F 7/065; B66F 7/0658; B66F 7/0691; B65B 65/02; B65B 5/00
See application file for complete search history.

(56) References Cited

U.S. PATENT DOCUMENTS 1,169,012 A * 1/1916 Craggs .................... B65B 63/02 53/529
2,621,891 A * 12/1952 Marsh ....................... B66F 3/12 254/131
(Continued)

FOREIGN PATENT DOCUMENTS

| | | | |
|---|---|---|---|
| DE | 102017123805 | A1 | 4/2019 |
| EP | 0895933 | A1 | 2/1999 |
| EP | 2666727 | A1 | 11/2013 |

OTHER PUBLICATIONS

International Search Report and Written Opinion dated Aug. 23, 2023, for International Application PCT/EP2022/086588.
(Continued)

*Primary Examiner* — Lee D Wilson
(74) *Attorney, Agent, or Firm* — The Dobrusin Law Firm, P.C.

(57) ABSTRACT

A lifting means for a packaging machine, which has a frame and moves a lifting table from a lowered position to a raised position and vice versa, the lifting means has two parallel shafts; two toggle levers, each having a first rotary lever and a second rotary lever, each of the two toggle levers are respectively provided between a shaft and the lifting table, each of the first rotary lever is rotationally fixedly connected to a respective shaft of the two parallel shafts; and at least two coupling rods are provided between the two parallel shafts.

20 Claims, 4 Drawing Sheets

(51) Int. Cl.

| | |
|---|---|
| ***B65B 51/14*** | (2006.01) |
| ***B65B 61/00*** | (2006.01) |
| ***B65B 65/02*** | (2006.01) |
| ***F16H 21/16*** | (2006.01) |

(56) References Cited

U.S. PATENT DOCUMENTS 3,623,707 A * 11/1971 Klopp .................. B66F 7/0608
187/269
4,941,797 A * 7/1990 Smillie, III ............... B66F 3/12
187/269
2018/0162708 A1* 6/2018 Pithoud ................. B66F 17/006
2025/0033822 A1* 1/2025 Fries ........................ B65B 43/08

OTHER PUBLICATIONS

International Preliminary Report on Patentability dated Nov. 13, 2023, for International Application PCT/EP2022/086588.

* cited by examiner

LIFTING MEANS FOR A PACKAGING MACHINE WITH TWO COUPLING RODS

CROSS REFERENCE TO RELATED APPLICATIONS

This application is a US National Stage entry of PCT/EP2022/086588 filed on Dec. 19, 2022, which claims priority to DE 10 2021 214 892.1 filed on Dec. 22, 2021, all of which are hereby incorporated by reference herein for all purposes.

FIELD

The present invention relates to a lifting means, in particular for a packaging machine, which has a frame and moves a lifting table from a lowered to a raised position and vice versa, comprising:

two parallel shafts, two toggle levers, each having a first rotary lever and a second rotary lever, wherein each toggle lever is provided between a shaft and the lifting table, wherein each first lever is rotationally fixedly connected to a shaft.

The present invention also relates to a packaging machine and to a method.

BACKGROUND

Generic lifting means of this kind are known from the prior art, for example EP 0 895 933 A1 or DE 10 2017 123 805 A1, and are used in particular in packaging machines. In these packaging machines, for example a lower material web is unrolled from a supply roll and intermittently conveyed along the packaging machine. In the thermoformer, a pack cavity is first formed into the lower material web in a forming station and then filled with a product to be packaged, in particular a foodstuff. The pack cavity is then closed with an upper material web, which is sealed onto the lower material, in a sealing station. This material web is also unrolled from a supply roll. The forming station and/or the sealing station generally have a lower tool and an upper tool, the lower tool being located below the lower material web and the upper tool being located above the upper material web. When the pack cavity is being formed into the lower material web and/or when an upper material web is being sealed onto the lower material web, the respective lower tool has to be raised, and during/before the onward conveyance of the pack cavities, said lower tool has to be lowered by an index again. In some cases, the upper tool also has to be raised and lowered, preferably in the opposite direction to, and synchronously with, the movement of the lower tool. For this purpose, the packaging machine has at least one lifting station, preferably a lifting station per tool.

SUMMARY

There is therefore constantly the need to improve these lifting stations and/or to provide a packaging machine with an improved lifting means.

The object is achieved with a lifting means, in particular for a packaging machine, which has a frame and moves a lifting table from a lowered to a raised position and vice versa, comprising:

two parallel shafts, two toggle levers, each having a first rotary lever and a second rotary lever, wherein each toggle lever is provided between a shaft and the lifting table, wherein each first lever is rotationally fixedly connected to a shaft, and wherein at least two coupling rods are provided between the two shafts.

The statements made with regard to this subject of the present invention apply equally to the other subjects of the present invention and vice versa. Features disclosed in connection with this subject of the present invention can be combined with other subjects of the present invention and vice versa.

The present invention relates to a lifting means, by means of which in particular at least one tool of a forming station of a packaging machine, a sealing tool or cutting tool, is transferred from an open to a closed position and back. In the open position, two tools, for example upper tool and lower tool, have been spaced apart from one another, and in the closed position, they have been moved toward one another. In a packaging machine, for example a material web is located between the two tools. In a simplified embodiment, one of the two tools is positionally fixed, for example by virtue of the tool being arranged on the frame of the lifting means and/or on the frame of the assigned packaging machine.

According to the invention, this lifting means has a frame, which consists, for example, of two parallel plates. This frame can be arranged on the frame of a packaging machine, in particular displaceably along the longitudinal extent of the packaging machine. As an alternative, the frame of the packaging machine is also the frame of the lifting means.

Furthermore, according to the invention, the lifting means has two parallel shafts, of which preferably only one is rotatingly driven in a motorized manner, in particular by means of an electric motor, preferably with a servomotor. The shaft is preferably rotated through 180° during each movement. The output shaft of the motor is preferably connected directly, without a transmission, to the shaft.

As an alternative, the drive shaft of the motor is connected to the shaft for example by means of a hollow shaft transmission. Again as an alternative, the drive is arranged next to the shaft and connected to the shaft by means of a transmission, for example a toothed belt transmission or a lever drive, in particular a toggle lever drive, wherein the drive is located within the lifting means or alternatively outside the lifting means, for example if the lifting means is very compact and there is not enough space available within the lifting means for arrangement of the motor. In this case, the motor may be arranged in the plane spanned by the shafts or alternatively outside the plane, for example above it.

The lifting means according to the invention also has two toggle levers, wherein in each case a toggle lever is connected to a shaft. Each toggle lever has a first rotary lever and a second rotary lever, which are each rotatingly connected to one another at one of their ends. Each toggle lever is respectively provided between one of the two shafts and the lifting table, wherein a lever of the toggle lever is rotationally fixedly connected to one of the two shafts. The first lever may be provided, for example forged or cast, in one piece with the shaft or be connected thereto in a materially bonded, form-fitting and/or force-fitting manner. For example, the first lever is welded to the shaft. Preferably, the toggle lever moves the lifting table from a lower dead center position, in which the two tools are at a maximum spacing from one another, to an upper dead center position, in which the tools are at their minimum spacing from one another or are even touching, and back.

According to the invention, at least two coupling rods are now provided between the two shafts. These coupling rods each transmit the torque of the motor-driven shaft to the other shaft, with the result that these move synchronously. The at least two coupling rods for example ensure that the torques move the toggle levers out of at least one of the two dead center positions.

The coupling rods are preferably arranged parallel to one another and are very particularly preferably embodied to be at least substantially structurally identical.

Both coupling rods are preferably connected to the same first rotary lever on the respective shaft. Each first rotary lever of the toggle lever is preferably connected to both coupling rods.

Preferably, the two coupling rods are connected to the respective rotary lever at different angular positions and/or at different spacings to the axis of rotation of the rotary lever.

The two shafts have a longitudinal extent direction. Preferably, the two coupling rods are provided offset relative to one another in relation to this longitudinal extent direction, but particularly preferably are provided offset relative to one another only by the thickness of the lever.

Preferably, each first lever has two opposite, in particular identical surfaces spaced apart from one another by the thickness of the lever. Particularly preferably, one coupling rod is then arranged adjacent to the one surface and the other coupling rod is arranged adjacent to the other surface on the first lever of the toggle lever.

According to a preferred embodiment of the present invention, the coupling rods are each U-shaped, the base of the “U” preferably being longer than the limbs of the “U”. Preferably, the limbs are of different length, and very particularly preferably, at least one limb is not provided at a right angle with respect to the base. The ends of the limbs of the U-shaped coupling rod are preferably each rotatably connected to a first lever of the toggle lever.

Preferably, a respective end of the two coupling rods and the second rotary lever are connected to the same first rotary lever of the toggle lever, but particularly preferably at three different locations on the first rotary lever.

According to a preferred embodiment of the present invention, at least one rotary lever of the toggle lever, in particular the second rotary lever connected to the lifting table, is curved. Particularly preferably, this lever has a rectilinear portion and a U-shaped portion.

As an alternative, the lifting means has more than two parallel shafts, for example if the lifting means is used to drive longer or additional tools and/or if required for the load transfer. Those skilled in the art will understand that the number of toggle levers and coupling rods increases accordingly, wherein two additional toggle levers and coupling rods are used per additional shaft to be attached, wherein, as an alternative, the coupling rods present for two parallel shafts are extended/widened up to the additional shaft(s).

A further subject according to the invention, or preferred subject of the present invention, is a generic lifting means in which the first rotary lever of the toggle lever in each case rotates through 178°-182°, preferably exactly through 180°, during the movement between the lowered to the raised position and vice versa.

The statements made with regard to this subject of the present invention apply equally to the other subjects of the present invention and vice versa. Features disclosed in connection with this subject of the present invention can be combined with other subjects of the present invention and vice versa.

A further subject according to the invention, or preferred subject of the present invention, is a generic lifting means in which the second rotary lever has a first axis of rotation and a second axis of rotation and in which, in the raised position of the lifting table, these first and second axes of rotation are aligned with the axis of rotation of the shaft in a perpendicular.

The statements made with regard to this subject of the present invention apply equally to the other subjects of the present invention and vice versa. Features disclosed in connection with this subject of the present invention can be combined with other subjects of the present invention and vice versa.

This embodiment according to the invention, or preferred embodiment, has the advantage that the lifting means can take a very large load in the raised position. Only very small torques, if any, are transmitted to the shafts.

This embodiment according to the invention, or preferred embodiment, also has the advantage that customary manufacturing tolerances, which cannot be avoided in spite of all the manufacturing precision, in the coupling rods and/or in the levers connected thereto, in particular with respect to their bearing spacing dimensions (effective dimensions), can be utilized in the sense that, for example, a V-shaped position of the lower lifting means toggle levers relative to one another is set in the region of the top dead center OT, wherein preferably one lever is slightly before OT and one slightly after OT, wherein the process loads are preferably distributed uniformly among the coupling rods and/or levers and are compensated/mediated with respect to their action on the drive, that is to say that only a small process load, if any, acts on the drive or the sum of the process loads acting on the drive is minimized. Those skilled in the art will understand that in the case of zero tolerance, that is to say in the case of exactly the same effective dimensions, the toggle levers can theoretically be exactly at OT, which is preferred in particular when distributing load among synchronized shafts, but is possible only with great difficulty in the technical implementation.

Another subject according to the invention, or preferred subject of the present invention, is a lifting means in which each shaft is at least triply rotatably mounted.

The statements made with regard to this subject of the present invention apply equally to the other subjects of the present invention and vice versa. Features disclosed in connection with this subject of the present invention can be combined with other subjects of the present invention and vice versa.

This embodiment according to the invention, or preferred embodiment, has the advantage that the diameter of the shaft has to be smaller than in the case of a two-point mounting, although this embodiment according to the invention, or preferred embodiment, requires very high precision in the manufacture of the lifting means.

Another subject according to the invention, or preferred subject of the present invention, is a lifting means in which the outer periphery of the shaft is locally flattened for the fastening of a lever.

The statements made with regard to this subject of the present invention apply equally to the other subjects of the present invention and vice versa. Features disclosed in connection with this subject of the present invention can be combined with other subjects of the present invention and vice versa.

Preferably, both shafts have corresponding flattened portions. Particularly preferably, a rotary bearing for a lever is mounted on these flattened portions, the axis of rotation of said bearing running parallel to the axis of rotation of the respective shaft. Particularly preferably, these two axes of rotation are spaced apart from one another. A possible advantage of the flattening is the resultant possible minimization of the spacing between the two axes of rotation or the targeted realization of a desired spacing, which constitutes a measure for the vertical movement of the upper tool, the upper lifting means.

According to a preferred embodiment of the present invention, the upper tool, i.e. the tool located above the material web, is not rigidly connected to the frame of the packaging machine, but rather is variable in terms of its vertical position just like the tool. This is preferably realized by virtue of the above-described shafts of the lifting means not being positionally fixedly arranged on the frame, but rather being vertically displaceable relative to the frame. This allows the entire lifting construction, and thus also the upper tool, to be moved up and down.

Preferably, the two shafts are each mounted on the frame of the lifting means by means of at least one, preferably in each case two parallel rotary levers. Particularly preferably, in each case one end of the rotary lever is rotatably connected to the frame and one end of the rotary lever is rotatably connected to the first lever of the toggle lever. The rotation of this rotary lever moves the respective shaft vertically.

In particular, each rotary lever has a first axis of rotation and a second axis of rotation. In the raised end position of the respective shaft, and according to a preferred embodiment, these first and second axes of rotation of the rotary lever are aligned with the axis of rotation of the respective shaft along a perpendicular.

Preferably, the diameter of the shaft varies with the longitudinal extent thereof.

Preferably, the lifting means has at least one, preferably two, in particular four guide rods. The lifting table is moved along these guide rods. The upper tool is preferably provided at an end of the guide rods.

Preferably, the lifting table bears a tool, in particular the lower tool.

Another subject of the present invention is a packaging machine having at least one lifting means according to the invention, or preferred lifting means, as described above.

The statements made with regard to this subject of the present invention apply equally to the other subjects of the present invention and vice versa. Features disclosed in connection with this subject of the present invention can be combined with other subjects of the present invention and vice versa.

Preferably, the longitudinal extent direction of the shafts is arranged transversely with respect to the conveying direction of a material web.

Another subject of the present invention is a method for raising and lowering a lower tool and an upper tool of a packaging machine with a lifting means, which has a frame and moves a lower tool and an upper tool from a lowered to a raised position and vice versa, comprising:

two parallel shafts, two toggle levers, each having a first rotary lever and a second rotary lever, wherein each toggle lever is respectively provided between a shaft and the lifting table, wherein each first lever is rotationally fixedly connected to a shaft, two toggle levers, each having a first rotary lever and a second rotary lever, wherein each toggle lever is respectively provided between a shaft and the frame of the lifting means, wherein each first lever is rotationally fixedly connected to a shaft, wherein, during the rotation of the shafts, these and the lifting table are raised and lowered in opposite directions.

The statements made with regard to this subject of the present invention apply equally to the other subjects of the present invention and vice versa. Features disclosed in connection with this subject of the present invention can be combined with other subjects of the present invention and vice versa.

This subject of the present invention relates to a method for raising and lowering a lower tool and an upper tool of a packaging machine with at least two shafts.

The lower tool is provided on a lifting table, with which two toggle levers engage. The toggle levers are preferably provided on different shafts. A lever of each toggle lever is rotationally fixedly connected to a respective shaft. Generally, the toggle levers are synchronized, in particular forcibly synchronized, with one another, for example by at least one coupling rod.

The upper tool is also connected directly or indirectly to two toggle levers, wherein a lever of each toggle lever is rotationally fixedly connected to a respective shaft. The toggle levers are preferably provided on different shafts. Generally, the toggle levers are synchronized, in particular forcibly synchronized, with one another, for example by at least one coupling rod.

The lever connected to the shaft may be identical for both toggle levers provided on a shaft.

At least one of the two shafts is driven. The shafts move the toggle levers, as a result of which the movement of the lifting table and a vertical displacement of the shafts is effected. The movement of the upper tool is not derived from the movement of the lower tool. Preferably, the upper tool is mounted on the shafts and is also moved vertically by the vertical movement thereof.

The shafts are not mounted on the framework of the packaging machine by means of an eccentric and/or are not moved vertically by an eccentric.

BRIEF DESCRIPTION OF THE FIGURES

The inventions will be explained below on the basis of the figures. These explanations are merely exemplary and do not restrict the general concept of the invention. The explanations apply equally to all the subjects of the present invention.

DETAILED DESCRIPTION

Figure 1:
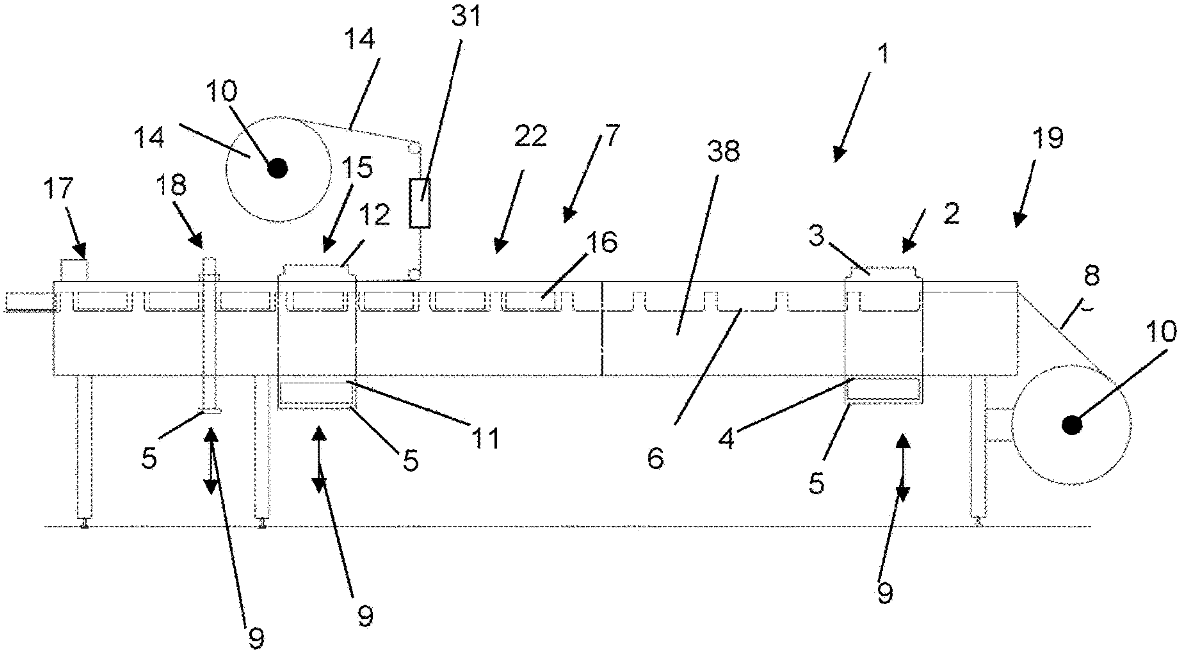
FIG. 1 shows the packaging machine according to the invention.
Figure 2:
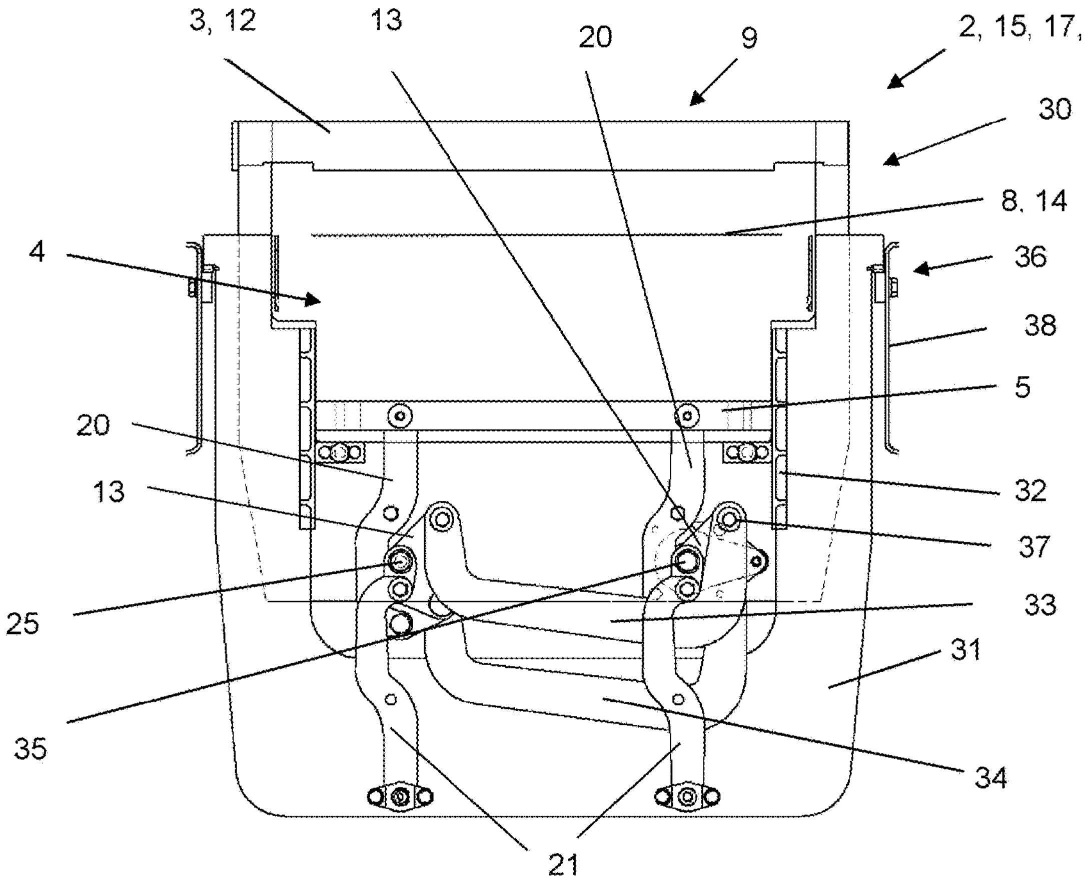
FIGS. 2-8 show the lifting means according to the invention.
Figure 3:
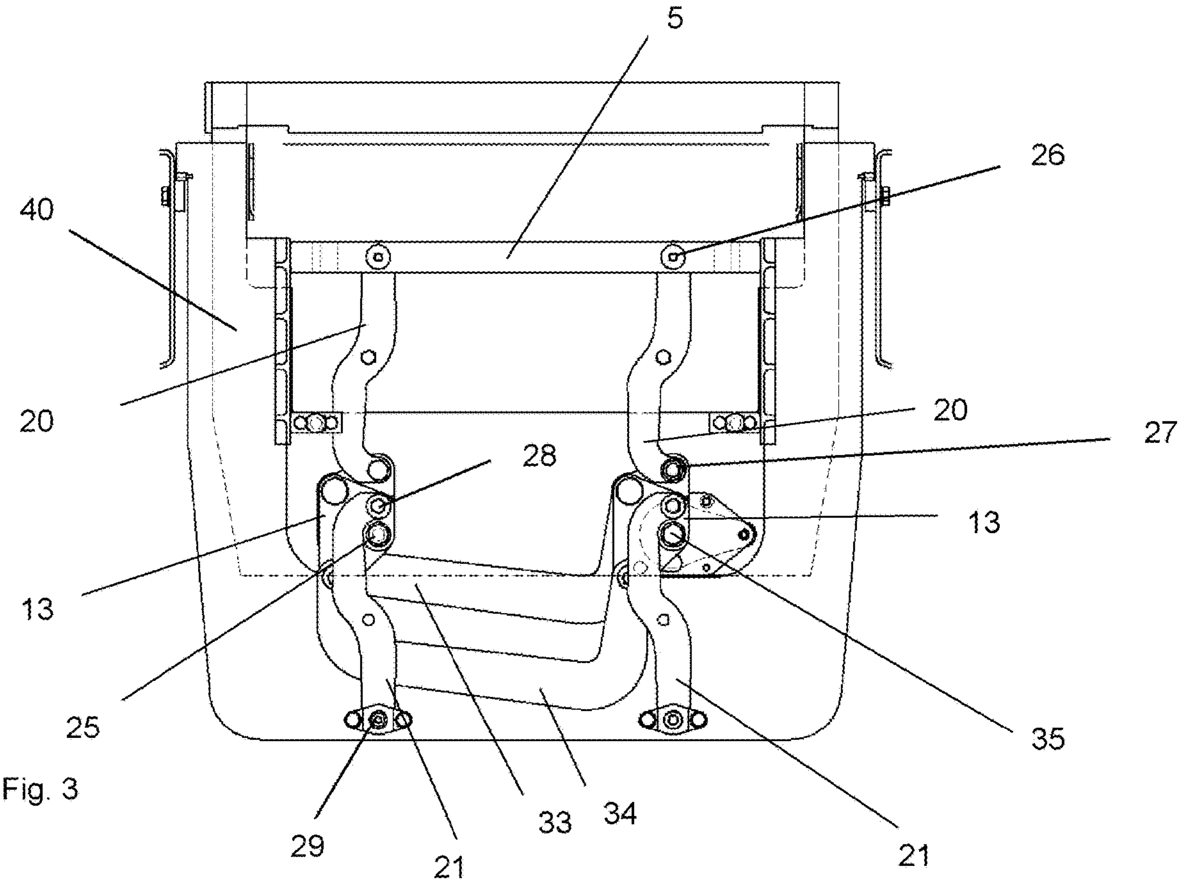
Figure 4:
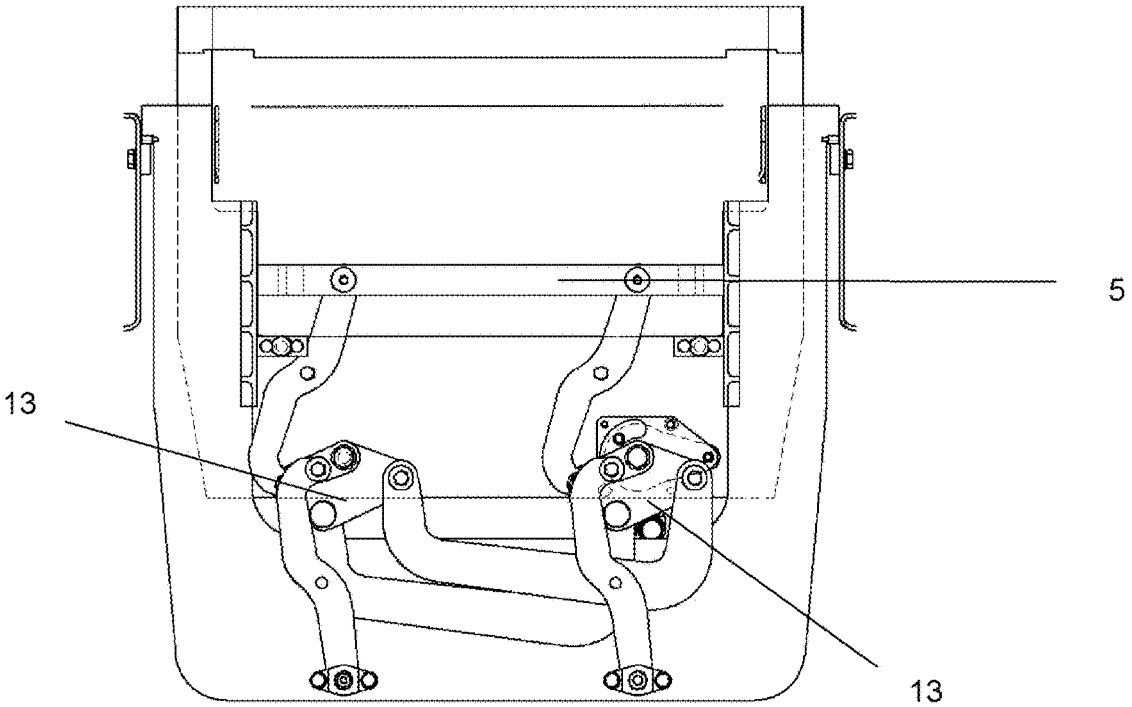
Figure 5:
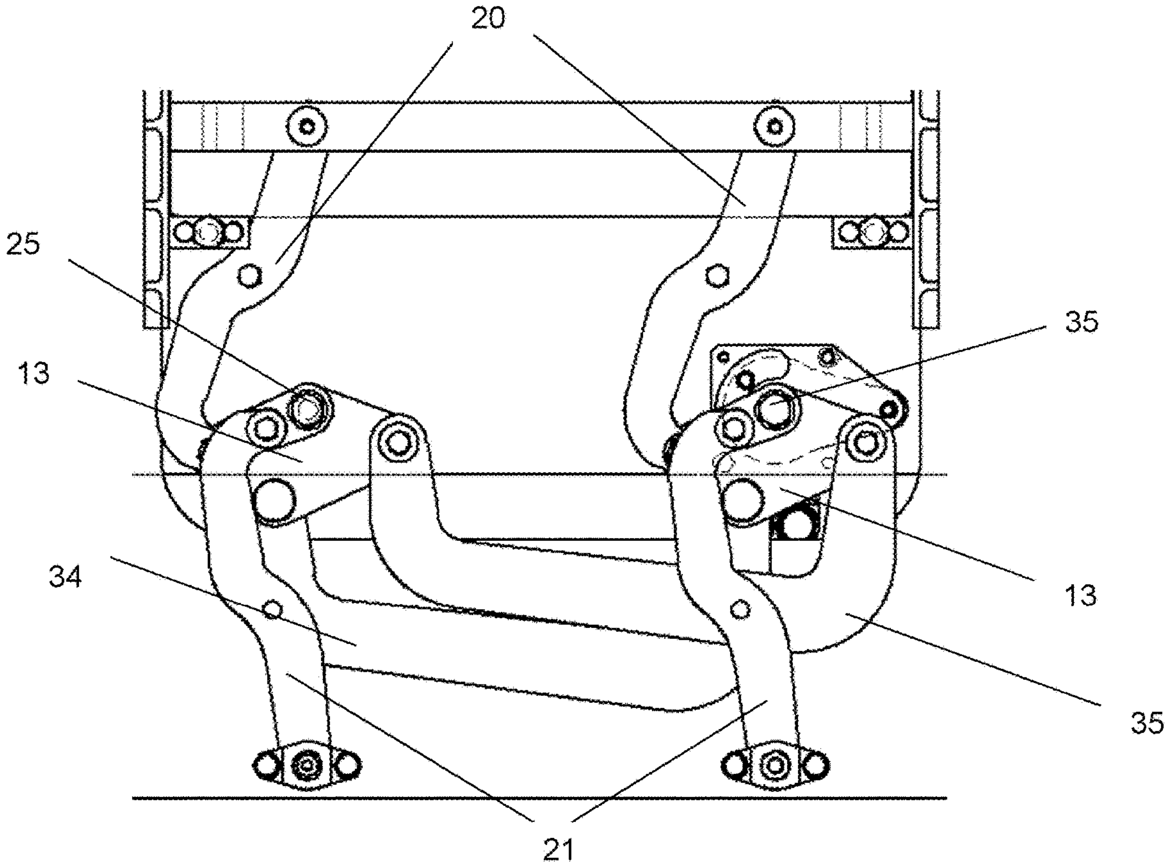

FIG. 1 shows the packaging machine 1 according to the invention, in the present case what is known as a thermoformer, which comprises a thermoforming station 2, a filling station 7 and a sealing station 15. A lower material web 8, here a plastics film web 8, is pulled off from a supply roll 10 and cyclically conveyed along the packaging machine according to the invention, here from left to right. The material web roll is generally mounted on a shaft. During a cycle, the lower material web 8 is conveyed onward by a forward pull, multiple forward pulls being required to produce a finished packaging. For this purpose, the packaging machine has two conveying means (not illustrated), in the present case in each case two endless chains, which are arranged to the right and left of the lower material web 8. Both at the start and at the end of the packaging machine, in each case at least one toothed wheel is provided for each chain, the respective chain being deflected around said toothed wheel. At least one of these toothed wheels is driven. The toothed wheels in the entry region and/or in the exit region may be connected to one another, preferably by a rigid shaft. Each conveying means has a multiplicity of clamping means, which grip the lower material web 8 in a clamping manner in the inlet region 19 and transmit the movement of the conveying means to the lower material web 8. In the outlet region of the packaging machine, the clamping connection between the conveying means and the lower material web 8 is released again. Downstream of the inlet region 19, a heating means may be provided, which heats the material web 8, in particular when the latter is at a standstill. In the thermoforming station 2, which in this case has an upper tool 3 and a lower tool 4 which has the form of the pack cavity to be produced, the pack cavities 6 can be formed into the heated material web 8. The lower tool 4 is arranged on a lifting table 5 which, as symbolized by the double-headed arrow, is vertically adjustable, this vertical adjustment being effected by the lifting device explained on the basis of FIGS. 2-5. The lower tool 4 is lowered before each advancement of the material web and raised again thereafter. As the packaging machine continues, the pack cavities are then filled with the product to be packaged 16 in the filling station 7. In the following sealing station 15, which also comprises an upper tool 12 and a vertically adjustable lower tool 11, an upper material 14 is fastened in a materially bonded manner to the lower material web 8 for example by sealing. In the sealing station, the upper tool and/or the lower tool are/is also lowered and/or raised before, and after, each transporting step of the material. The upper material web 14 is unrolled from a material web roll, which is mounted on a shaft, and can be guided in conveying means or conveyed by conveying chains, these conveying means then extending only from the sealing station and, possibly, downstream. Otherwise, the statements made with regard to the conveying means of the lower material web apply here. The upper material web may also be heated with a heating means and be thermoformed by means of a top forming tool 31. For the sealing, the lower tool 11 provided is for example a heatable sealing frame which has an opening per pack cavity into which the pack cavity dips during the sealing, i.e. during the upward movement of the lower sealing tool. For the sealing, the upper material web and the lower material web are compressed between the upper tool 12 and the lower tool 11 and are connected under the influence of heat and pressure. After the sealing, the tools 11, 12 are moved apart vertically again by means of the lifting means 9. A dancer is preferably provided between the respective supply roll and the sealing tool, said dancer compensating for the intermittent advancement of the lower material web 8 and thus the intermittent pull off of the upper material web 14. The dancer may serve as material web accumulator and/or for producing a certain material web tension. Those skilled in the art will understand that multiple upper material webs may be present, for example in the case of a multi-layer pack or a pack with multiple upper material web layers. Preferably, a dancer is then provided over the course of each upper material web. Furthermore, those skilled in the art will understand that a dancer may also be provided in the region of the lower material 8, preferably downstream of the supply roll thereof. As the packaging machine continues, the finished packagings are separated, this separation being effected in the present case using the cross-cutter 18 and the longitudinal cutter 17. In the present case, the cross-cutter 18 is also able to be raised and lowered using a lifting device 9.

The packaging machine according to the invention may also be what is known as a tray sealer, in which filled pack cavities are closed with a covering material.

FIGS. 2-5 and 7-8 each show an embodiment of the same lifting means 9, which may be part of the forming station 2, of the sealing station 15 and/or of the cutting station 17. This lifting means has a frame 31, for example two parallel plates, which may be arranged, for example placed, for example on the frame of the packaging machine. Those skilled in the art will understand that the frame 31 may alternatively be part of the packaging machine. According to the invention, the lifting means 9 has two parallel shafts 25, 35, of which one, here the shaft 35, is driven by means of a motor, here preferably a servomotor, and the shaft is rotated clockwise and counterclockwise through 180° in alternation. The shaft 35 is connected to the shaft 25 by means of the coupling rods 33, 34, such that the rotational movement of the shaft 35 is transmitted to the shaft 25. Furthermore, each shaft is connected to at least one toggle lever, which in each case comprises a first rotary lever 13 and a second rotary lever 20. One end of the second rotary lever 20 is rotatably connected to a lifting table 5. The other end of the rotary lever 20 is rotatably mounted at the end of a first rotary lever 13, which is in turn rotationally fixedly connected to a shaft 25, 35 or part of the shaft 25, 35. A rotation, here counterclockwise, of the shaft 25, 35 brings the toggle lever from a folded (FIG. 2) to an elongated position (FIG. 3) and raises the lifting table 5 as a result. The lifting table preferably moves alternately between an upper and a lower dead center. The lifting table 5 may, for example, bear a forming, sealing or cutting tool 4, 11, in particular the so-called lower tool, which is located below the conveying plane of the material web 8, 14. In general, the lifting table is mounted on at least one, preferably two, in particular four guides, in order to guide the lifting table during its vertical movement.

If the upper tool 3, 12, for example the forming and/or sealing station, is also intended to be moved vertically, the shafts 25, 35 are mounted not positionally fixedly on the frame 31 but rather vertically displaceably. For this purpose, at least one, preferably two rotary levers 21 are provided per shaft. The one end of the rotary lever 21 is mounted on the frame 31 by means of a rotary bearing. The other end of the rotary lever 21 is rotatably provided on the shaft, in particular on a lever, particularly preferably on the first lever 13 of the toggle lever. If the shaft 25, 35 rotates, it is raised or lowered. The shaft 25, 35 is connected to the upper tool 3, 12 which, as a result, is also raised or lowered.

The lifting means according to the invention preferably has at least one, particularly preferably multiple and very particularly preferably all of the following special structural features:

The two shafts 25, 35 are coupled to one another by at least two coupling rods 33, 34. The coupling rods may be U-shaped. The attachment of the ends of the first coupling rod 33 to the shafts 25, 35 preferably differs from the attachment of the ends of the second coupling rod 34 to the shafts 25, 35. The ends of the two coupling rods 33, 34 may be arranged on a shaft 25, 35 at different angular positions and/or at a different radial spacing to the axis of rotation of the respective shaft 25, 35.

The first rotary lever 13 of the toggle lever preferably performs a 180° movement during a movement between two dead centers.

At least the second rotary lever 20 of the toggle lever and the two coupling rods are rotatably mounted on the first rotary lever 13 of the toggle lever, in particular at different locations on the rotary lever 13. If a so-called upper lifting means is also intended to be implemented, the rotary lever 21 required therefor is preferably also mounted on the first rotary lever 13 of the toggle lever 13, 20.

The second rotary lever 20 of the toggle lever and/or the rotary lever 21 of the upper lifting means are at least partially curved components. They preferably have a straight and a U-shaped portion.

At least at one, preferably at both dead centers of the movement of the lifting table (cf. FIGS. 2 and 3), the axis of rotation of the bearings 26, 27 at the ends of the second rotary lever are provided in a plane, in particular a perpendicular plane, with the axis of rotation of the shaft 25, 35. If an upper lifting means is also desired, the axes of rotation of the bearings 28, 29 at the ends of the rotary lever 21 are preferably arranged in a plane, in particular a perpendicular plane, with the axis of rotation of the shaft 25, 35. Very particularly preferably, per shaft, the axes of rotation of the bearings 26-29 and the axis of rotation of the shaft 25, 25 are arranged in a plane, in particular a perpendicular plane, at the two dead centers.

At the two dead centers, the axes of rotation of the rotary bearings by means of which the couplings rods 33, 34 are mounted on the respective first rotary lever 13 of the toggle lever are provided in a perpendicular plane.

Each shaft 25, 35 is mounted in at least three rotary bearings.

The diameter of each shaft 25, 35 varies with the longitudinal extent thereof.

Figure 6:
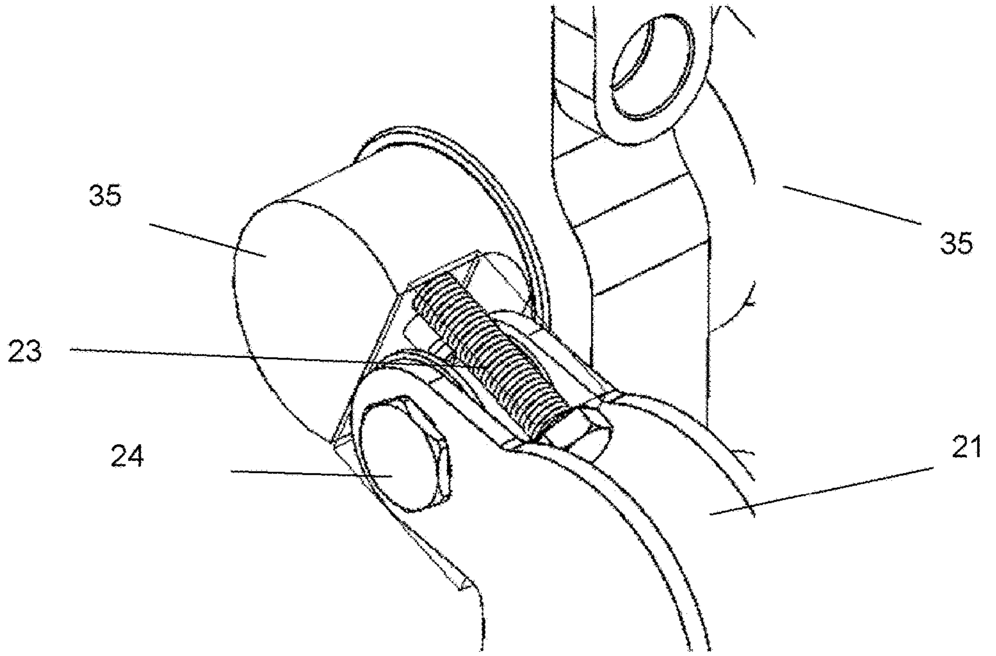

FIG. 6 shows a detail of the attachment of a lever, here the lever 21 for the upper lifting means, to the shaft 25, 35. It can clearly be seen that the periphery of the shaft is locally flattened and a rotary bearing 24 for the rotary lever is arranged at the flattened location. The rotary bearing may be reversibly connected to the shaft 25, 35, for example by means of the screw 23.

It can also be gathered from the illustration according to FIG. 6 that the diameter of the shaft 25, 35 can vary with the longitudinal extent thereof.

Figure 7:
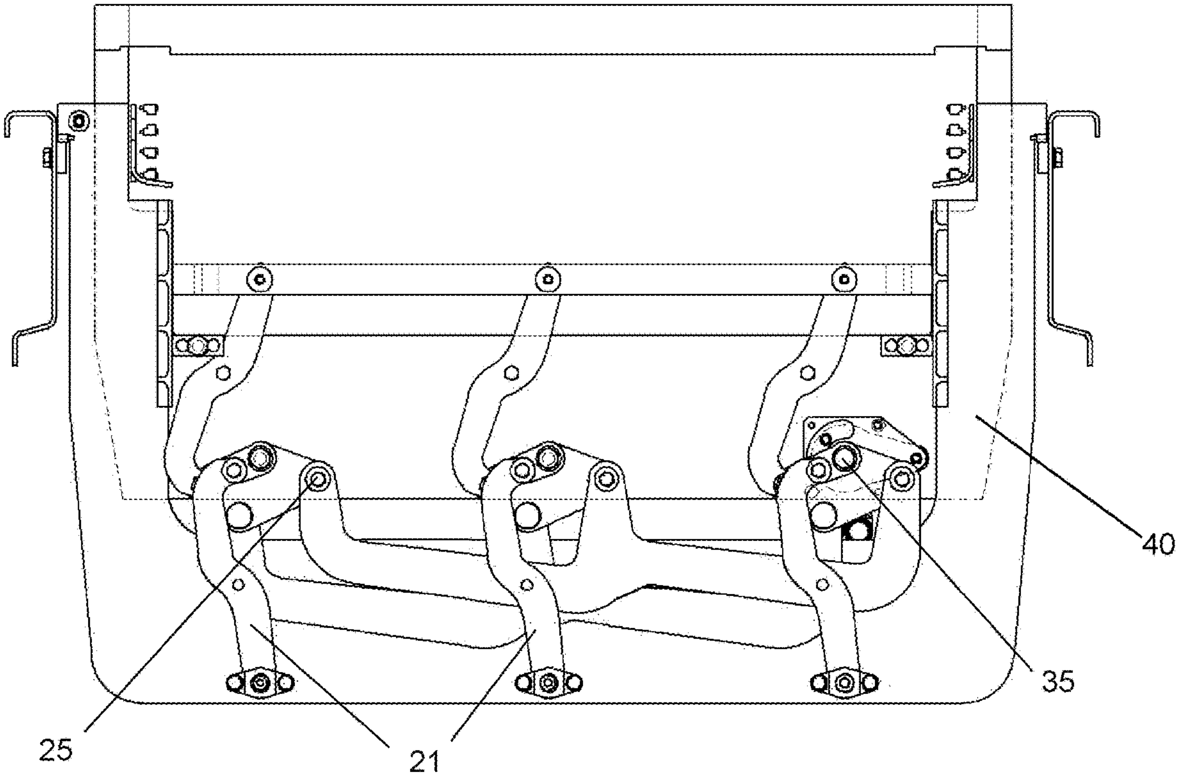

FIG. 7 shows an embodiment of the lifting means with three parallel shafts.

Figure 8:
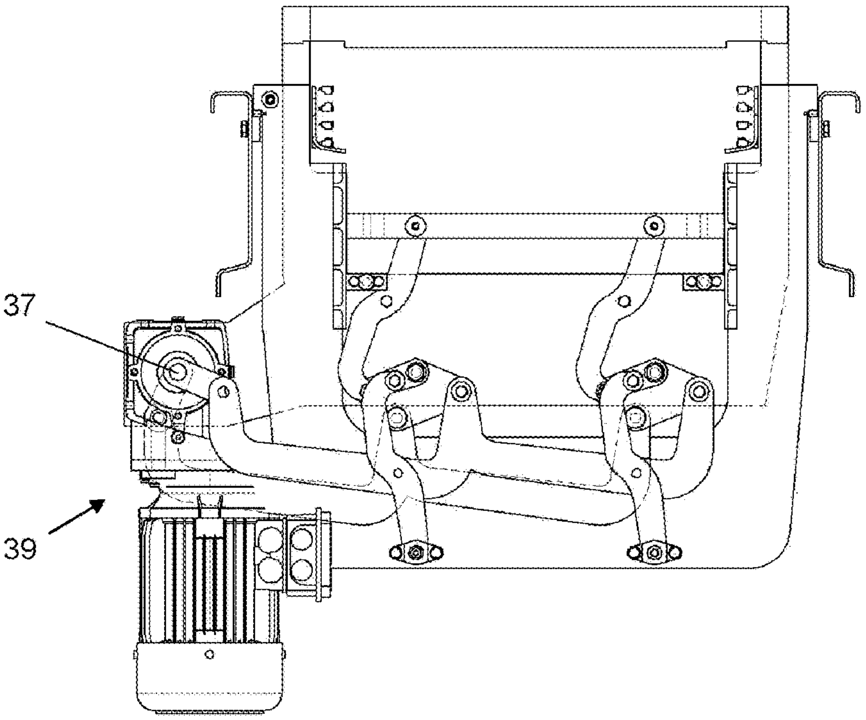

FIG. 8 shows an embodiment of the lifting means with a drive 39 arranged outside the lifting means, the attachment of the coupling rod to the drive shaft 37 lying substantially in the plane spanned by the two parallel shafts.

The functioning of the lifting means is explained again below. If a shaft rotates, for example the shaft 25, the first rotary lever 13 rotationally fixedly provided on it is also rotated. The second lever 21 and the second lever 20 are rotatably arranged on this lever 13. The levers 13, 21 and 13, 20 form a respective toggle lever, which is driven in each case by a shaft, here the shaft 25. The toggle lever 13, 20 moves the lifting table 5, and thus the lower tool, up and down during a rotation of the shaft 25. The toggle lever 13, 21 is provided between the shaft 25, 35 and the frame 31 of the lifting means and displaces the shaft 25 vertically. Those skilled in the art will understand that the two toggle levers 13, 20 and 13, 21 do not have to have a common first lever 13, rather each toggle lever can have its own first lever, which are then preferably provided axially offset relative to one another on the shaft 25. The shaft 25 is rotatably mounted in a base 40 (illustrated in dashed lines) which is also moved vertically by the vertical movement of the shaft 25. The upper tool 3, 12 is mounted on the base 40 and also performs the movement thereof.

LIST OF REFERENCE SIGNS

1 Packaging machine
2 Forming station, thermoforming station
3 Upper tool of the thermoforming station (not illustrated)
4 Lower tool of the thermoforming station (not illustrated)
5 Lifting table, carrier plate, carrier of a tool of the sealing station, thermoforming station and/or of the cutting device
6 Pack cavity
7 First filling station
8 Material web, material web, lower material web
9 Lifting device, lifting means
10 Supply roll, film roll
11 Lower tool of the sealing station (not illustrated)
12 Upper tool of the sealing station (not illustrated)
13 First rotary lever
14 Upper material web, upper material web, covering material
15 Sealing station
16 Product to be packaged
17 Longitudinal cutter, cutting station
18 Cross-cutter, cutting station
19 Inlet region
20 Second rotary lever
21 Rotary lever of upper lifting means
22 Insertion region, insertion station, filling station
23 Attachment means, screw
24 Rotary bearing of the rotary lever 21
25 Shaft
26 First axis of rotation of the second rotary lever on the lifting table 5
27 Second axis of rotation of the second rotary lever on the first rotary lever 13
28 First axis of rotation of the rotary lever 21 on the lever 13
29 Second axis of rotation of the rotary lever 21 on the frame 31
30 Upper lifting means, upper lifting frame
31 Lifting frame, frame of the lifting means
32 Guide, double guide
33 Coupling rod, first coupling rod, synchronizing rod
34 Coupling rod, second coupling rod, synchronizing rod
35 Drive shaft
36 Frame, fastening location, placing location
37 Attachment of the coupling rod to the drive shaft Second end of the rotary lever 33
38 Frame of the packaging machine, machine frame
39 Drive, motor, gear motor
40 Base

The invention claimed is:

1. A lifting means for a packaging machine, which has a frame and moves a lifting table from a lowered position to a raised position and vice versa, the lifting means comprising:

two parallel shafts, two toggle levers, each having a first rotary lever and a second rotary lever, wherein each of the two toggle levers are provided between a respective one of the two parallel shafts and the lifting table, wherein the first rotary lever of each of the two toggle levers is rotationally fixedly connected to the respective one of the two parallel shafts, wherein at least two coupling rods are provided between the two parallel shafts, and wherein the second rotary lever of each of the two toggle levers is curved.

2. The lifting means as claimed in claim 1, wherein the first rotary lever of each of the two toggle levers rotates through an angle of 178°-182° or exactly through 180°, during movement of the lifting table between the lowered position and the raised position and vice versa.

3. The lifting means as claimed in claim 1, wherein the second rotary lever of each of the two toggle levers has a first axis of rotation and a second axis of rotation, and in the raised position of the lifting table, the first axis of rotation and the second axis of rotation are each perpendicular to an axis of rotation of the respective one of the two parallel shafts.

4. The lifting means as claimed in claim 1, wherein each of the two parallel shafts is at least triply rotatably mounted.

5. The lifting means as claimed in claim 1, wherein an outer periphery of each of the two parallel shafts is locally flattened for fastening of a lever.

6. The lifting means as claimed in claim 1, wherein the at least two coupling rods are each connected to the first rotary lever of the respective one of the two parallel shafts.

7. The lifting means as claimed in claim 6, wherein the at least two coupling rods are connected to a respective first rotary lever at different angular positions and/or at different spacings to an axis of rotation of the first rotary lever.

8. The lifting means as claimed in claim 1, wherein the two parallel shafts each have a longitudinal extent direction, and the at least two coupling rods are provided offset relative to one another in relation to the longitudinal extent direction.

9. The lifting means as claimed in claim 1, wherein the at least two coupling rods are each U-shaped.

10. The lifting means as claimed in claim 1, wherein a respective end of the at least two coupling rods and the second rotary lever are connected to the same first rotary lever.

11. The lifting means as claimed in claim 1, wherein the two parallel shafts are vertically displaceable relative to the frame.

12. The lifting means as claimed in claim 11, wherein the two parallel shafts are each mounted on the frame by means of at least one, or two parallel rotary levers.

13. The lifting means as claimed in claim 12, wherein one end of each of the at least one or two parallel rotary levers is rotatably connected to the frame and another end is rotatably connected to the respective first rotary lever.

14. The lifting means as claimed in claim 12, wherein each of the two rotary levers has a first axis of rotation and a second axis of rotation, and wherein in a raised position of the respective one of the two parallel shafts, the first axis of rotation and the second axis of rotation are aligned with an axis of rotation of the respective one of the two parallel shafts along a perpendicular.

15. A packaging machine comprising the lifting means as claimed in claim 1.

16. The lifting means as claimed in claim 1, wherein the two parallel shafts are arranged transversely with respect to a conveying direction of a material web.

17. A lifting means for a packaging machine, which has a frame and moves a lifting table from a lowered position to a raised position and vice versa, the lifting means comprising:

two parallel shafts, two toggle levers, each having a first rotary lever and a second rotary lever, wherein each of the two toggle levers are provided between a respective one of the two parallel shafts and the lifting table, wherein the first rotary lever of each of the two toggle levers is rotationally fixedly connected to the respective one of the two parallel shafts, wherein at least two coupling rods are provided between the two parallel shafts, and wherein an outer periphery of each of the two parallel shafts is locally flattened for fastening of a lever of the first rotary lever and the second rotary lever.

18. A lifting means for a packaging machine, which has a frame and moves a lifting table from a lowered position to a raised position and vice versa, the lifting means comprising:

two parallel shafts, two toggle levers, each having a first rotary lever and a second rotary lever, wherein each of the two toggle levers are provided between a respective one of the two parallel shafts and the lifting table, wherein the first rotary lever of each of the two toggle levers is rotationally fixedly connected to the respective one of the two parallel shafts, wherein at least two coupling rods are provided between the two parallel shafts, wherein the at least two coupling rods are each connected to the first rotary lever of the respective one of the two parallel shafts, and wherein the at least two coupling rods are connected to the respective first rotary lever at different angular positions and/or at different spacings to an axis of rotation of the first rotary lever.

19. A lifting means for a packaging machine, which has a frame and moves a lifting table from a lowered position to a raised position and vice versa, the lifting means comprising:

two parallel shafts, two toggle levers, each having a first rotary lever and a second rotary lever, wherein each of the two toggle levers are provided between a respective one of the two parallel shafts and the lifting table, wherein the first rotary lever of each of the two toggle levers is rotationally fixedly connected to the respective one of the two parallel shafts, wherein at least two coupling rods are provided between the two parallel shafts, and wherein the two parallel shafts each have a longitudinal extent direction, and in that the at least two coupling rods are provided offset relative to one another in relation to the longitudinal extent direction.

20. A lifting means for a packaging machine, which has a frame and moves a lifting table from a lowered position to a raised position and vice versa, the lifting means comprising:

two parallel shafts, two toggle levers, each having a first rotary lever and a second rotary lever, wherein each of the two toggle levers are provided between a respective one of the two parallel shafts and the lifting table, wherein the first rotary lever of each of the two toggle levers is rotationally fixedly connected to the respective one of the two parallel shafts, wherein at least two coupling rods are provided between the two parallel shafts, and wherein the at least two coupling rods are each U-shaped.

* * * * *